US008516785B2

(12) United States Patent  (10) Patent No.: US 8,516,785 B2
Brown  (45) Date of Patent: Aug. 27, 2013

(54) JET ENGINE INTAKE GUARD

(75) Inventor: Myron L. Brown, Bonita Springs, FL (US)

(73) Assignee: Tojali Corporation, Inc., Bonita Springs, FL (US)

( * ) Notice: Subject to any disclaimer, the term of this patent is extended or adjusted under 35 U.S.C. 154(b) by 284 days.

(21) Appl. No.: 12/928,419

(22) Filed: Dec. 9, 2010

(65) Prior Publication Data

US 2012/0042958 A1  Feb. 23, 2012

Related U.S. Application Data

(60) Provisional application No. 61/283,922, filed on Dec. 10, 2009.

(51) Int. Cl.
*F02G 3/00*  (2006.01)

(52) U.S. Cl.
USPC ........ 60/39.092; 244/53 B; 55/306; 137/15.1; 137/15.2; 415/121.2

(58) Field of Classification Search
USPC .... 60/39.092, 39.091; 415/121.2; 244/53 B; 55/306; 137/15.1, 15.2
See application file for complete search history.

(56) References Cited

U.S. PATENT DOCUMENTS

| | | | |
|---|---|---|---|
| 2,603,945 A | | 7/1952 | Brown |
| 4,149,689 A | | 4/1979 | McDonald |
| 4,178,124 A | | 12/1979 | Puskas |
| 4,736,907 A | | 4/1988 | Steffen |
| 5,259,724 A | | 11/1993 | Liston et al. |
| 5,411,224 A | | 5/1995 | Dearman et al. |
| 5,660,357 A | | 8/1997 | Grossman et al. |
| 5,967,169 A | | 10/1999 | Engel et al. |
| 5,977,866 A | | 11/1999 | Joseph, Jr. et al. |
| 6,598,384 B1 | | 7/2003 | Adkins |
| 6,883,751 B2 | | 4/2005 | Koncsek |
| 6,948,910 B2 | | 9/2005 | Polacsek |
| 8,052,083 B1 * | 11/2011 | Moran | ................... 244/53 B |
| 8,117,820 B1 * | 2/2012 | Briscoe | ............... 60/39.092 |
| 2010/0284791 A1 * | 11/2010 | Flores | ................ 415/121.2 |
| 2011/0011055 A1 * | 1/2011 | Troy | .................. 60/39.092 |

* cited by examiner

*Primary Examiner* — William H Rodriguez
*Assistant Examiner* — Craig Kim
(74) *Attorney, Agent, or Firm* — McNair Law Firm, P.A.; Seann P. Lahey

(57) ABSTRACT

A jet engine air intake guard system wherein direct axial air flow into an engine during takeoff and landing may be temporarily closed off while air intake is provided laterally through screened air intake ports located on a cylindrical housing that extends forward of the conventional air intake cowling openings.

1 Claim, 2 Drawing Sheets

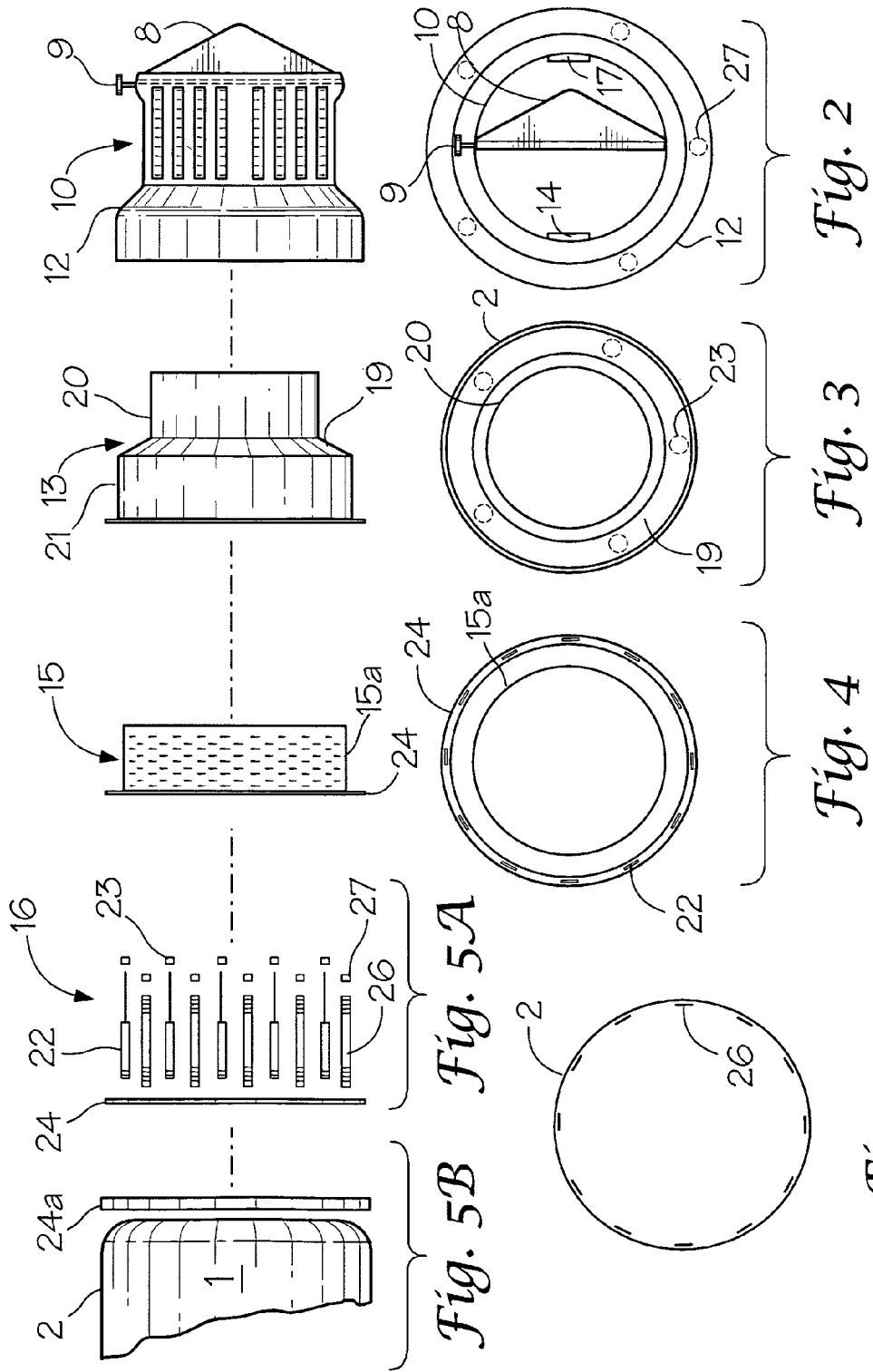

JET ENGINE INTAKE GUARD

CROSS REFERENCE TO RELATED APPLICATION

This application is a utility application claiming priority of U.S. provisional application Ser. No. 61/283,922 filed Dec. 10, 2009 having the same title.

FIELD OF THE INVENTION

The present invention relates particularly to an air intake guard for the jet engine of an aircraft and generally to an intake guard for any gas turbine or similar engine where airborne debris or birds are a hazard.

BACKGROUND OF THE INVENTION

Airborne objects, including birds and runway debris, have too frequently been the cause of malfunction, stalling or total destruction of an engine of a jet airplane by being drawn into the intake of the engine. To prevent such occurrences and the possible disastrous consequences, the use of protective guards for the intake of the engines has been the subject of a number of designs and patented devices. Some of these devices take the shape of screens or cages positioned in front of the air intake for the jet engine. Examples of these types are U.S. Pat. No. 4,149,689 to John McDonald for a "Protective Screen for Jet-Engine Intake"; U.S. Pat. No. 5,411,224 to Raymond M. Dearman, et al. for a "Guard for Jet Engine" which resembles a cone positioned or mounted on the engine intake; and U.S. Pat. No. 6,598,384 B1 to Richard Adkins for "Intake Shield for Gas Turbine Engines. Some devices use a movable screen which can be moved into or out from the intake and as examples of these are U.S. Pat. No. 5,967,169 to Herbert Engel et al. for "Air Intake for Engines" and U.S. Pat. No. 6,883,751 B2 to Joseph L. Koncsek for "Apparatus and Method for Preventing Foreign Object Damage to an Aircraft". The foregoing mentioned patents are not intended to be an exhaustive listing of the prior art but are mentioned by way of example and show that the prior art devices, in general, tend to continuously inhibit the flow of air into the engine even after take-off and reaching cruising altitudes. Accordingly, it is a general object of the present invention to provide an air intake guard system that is simple, reliable, and allows for improved air flow as compared to prior art devices. This object and others are achieved by the present invention which is described below.

SUMMARY OF THE INVENTION

In a preferred embodiment the invention is a jet engine intake guard system comprising a main cylindrical housing or cowling in which a jet engine may be mounted, said cowling having a cylindrical intake end where air enters in axial flow and an exhaust end; a bell-shaped housing rigidly mounted coaxially with and forward of the main cowling; said bell-shaped housing being spaced apart from the intake end of the cowling leaving a lateral open space between the bell-shaped housing and the cowling; a slotted cylindrical sleeve coaxially positioned with respect to the main cowling and with the bell-shaped housing; said sleeve being movable forward and back in a telescoping manner by hydraulic or electrical means, said bell-shaped housing be adapted for co-axial movement by the slidable sleeve within the housing so that when the slidable sleeve is retracted its lateral area will cover the open lateral space between the bell-shaped housing and the intake opening of the main cowling; a cylindrical nose piece coaxially mounted on the forward end of the bell-shaped housing, said cylindrical nosepiece having air intake ports distributed around its lateral surface; and, a conical-shaped butterfly valve mounted on the forward end of said nosepiece covering the forward intake opening thereof, said conical valve being rotatable 180° from an open to a closed position whereby when in the closed position no debris striking the conical valve will be deflected away from the engine and be the primary deflective means for protecting the engine, as air enters the lateral intake ports on the nose piece and the lateral space between the cowling and the bell-shaped housing. Once at an altitude at which a collision with birds or debris is unlikely, the butterfly valve is opened and the slidable sleeve is moved back to seal against the main cowling. The preferred construction materials of the sleeve and wafer are titanium or high strength stainless steel. The ports may be covered with screens or bars to prevent any debris from being sucked in laterally. In addition, de-icing equipment will be included as well as air intake vacuum measuring instrumentation means to monitor air intake pressure and flow to the engine at all times.

In another embodiment, the invention is a bell-shaped housing spaced apart from but rigidly attached to the front of the cowling for a jet engine, the housing is coaxially mounted with the cowling intake opening and is carried by a series of bolts distributed around the perimeter of the cowling that extend and hold the bell-shaped housing. A nosepiece is attached to the bell-shaped housing which has an opening on its forward end to which a cylindrical nosepiece is attached, the nosepiece having lateral air admitting ports distributed around its lateral surface and the nosepiece being coaxially mounted with the cowling and the bell-shaped housing. The forward end of the nosepiece is covered by a conical member operating as a butterfly valve which can be rotated to open and to close positions. Inside the bell-shaped housing a slidable sleeve is positioned whose diameter is great enough to cover the intake opening of the main cowling at the sleeve's rearward end and the sleeve's forward end has a smaller diameter that conforms to the interior of the bell-shaped housing so that it may be slidably moved by hydraulic or electrical means from a first position where it closes the space between the cowling and the bell-shaped housing in a first position and in a second position is moved forward so that it leaves open space between the bell-shaped housing and cowling which functions as a lateral air intake. When the sleeve is in the withdrawn or open position to let air in laterally, the butterfly valve will be closed and when the butterfly valve is open the slidable sleeve will move downwardly to close off the space between the cowling and bell-shaped housing. Thus, the engine is protected from birds and debris when the wafer or conical butterfly valve is closed and the slidable sleeve is open admitting air laterally and when the butterfly valve is open the sleeve is moved to cover the lateral area and provide straight through flow of air to the engine.

In another embodiment, the present invention is a method for preventing birds and debris from entering a jet engine by closing off direct axial flow from outside air to the engine and providing a means for lateral intake of air during takeoff and landing when debris and birds are most likely to be present.

DESCRIPTION OF THE DRAWINGS

Attached hereto and make a part of this disclosure are drawings which are provided by way of illustration and not by way of limitation. In the drawings:

FIG. 2 shows in its upper portion a side view of the nosepiece, the fixed lateral air intake ports and bell-shaped housing of the present invention. In the lower part of FIG. 2 is shown the front view of these components;

FIG. 3 shows the sliding sleeve of the present invention from a side view in the upper part of this figure and in the lower part is a frontal view of the sliding sleeve;

FIG. 4 shows, in the upper portion of the figure, the side view of the screen or mesh to prevent debris from entering laterally into the engine and the lower part of the figure shows the front view;

FIG. 5 schematically shows a frontal view of the cowling or main housing of the engine showing the arrangement of the support bolts around the perimeter of the cowling opening;

FIG. 5A schematically shows the array or distribution of hydraulic cylinders and support bolts from a side view; and FIG. 5B shows a section of the engine housing or cowling from a side view with an adapter plate for securing the intake guard of the invention to the cowling.

DETAILED DESCRIPTION OF THE INVENTION

Figure 1:
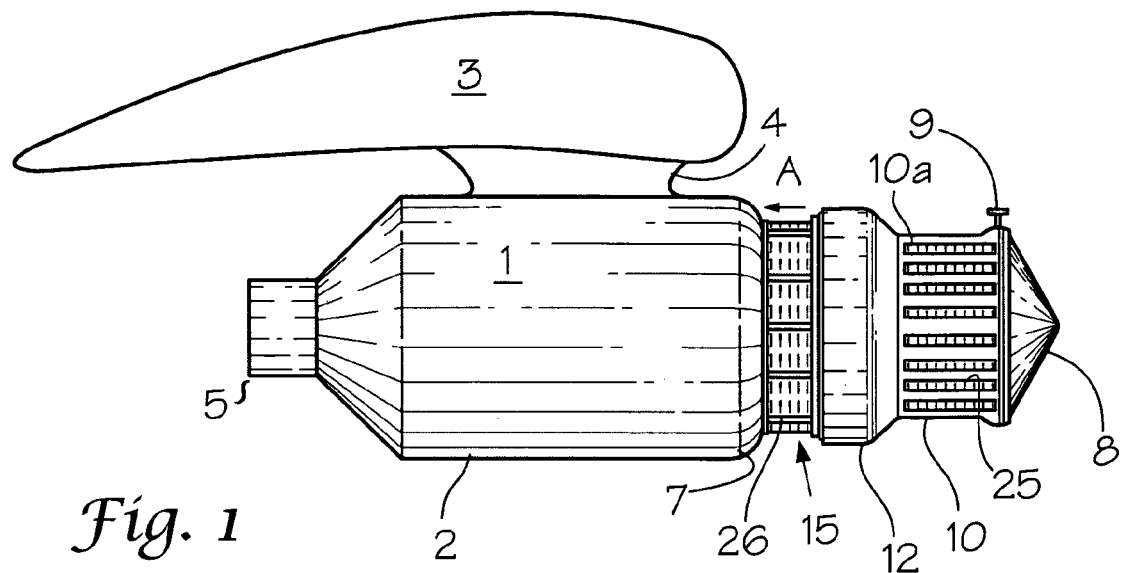
FIG. 1 is a schematic representation of a jet engine cowling mounted on the wing of an aircraft showing the air intake guard of the invention in the closed position all the lateral ports or openings in the open position.

Referring now to the drawings, the parts of the invention will be identified and their functions described.

In FIG. 1, the jet engine compartment 1 in which a jet engine for an airplane would be located comprises housing or cowling 2 which is suspended from airplane wing 3 by support 4. The cowling has an exhaust end 5 and an intake end 7. Bell-shaped housing 12 is shown spaced apart from the cowling 2 by a distance A. The nosepiece 10 is shown with columns 10a carrying the conical cover 8 mounted as a butterfly valve which is pivotally carried by pivots 9. Air intake slots 25 are located between the support columns.

Figure 1A:
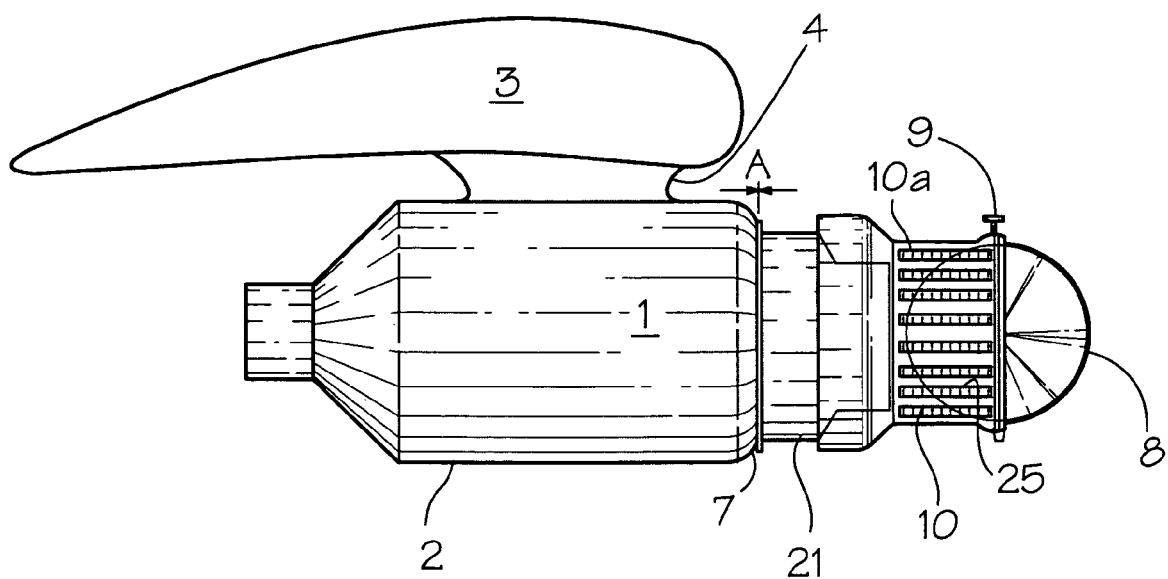
FIG. 1A shows the air intake guard of FIG. 1 in the cruising position with the lateral intake ports adjacent the cowling closed.

Looking now at FIGS. 1 and 1A, the operation of the intake guard of the invention will be described. In FIG. 1, the conical cover 8 covers the air intake for the axial flow, direct air entering the engine and air must now go through the ports 25 in the nose section and through the ports 15 adjacent the cowling. These are lateral ports and the conical-shaped cover prevent any birds or debris from entering the engine. In FIG. 1A, the sliding sleeve having a cylindrical section with lateral surface 21 has moved into place covering the ports 15 and the conical-shaped butterfly valve cover 8 is opened and has been pivotally rotated to the open position so that air flows axially directly through the opening and into the engine. This operation can be seen in FIG. 2 where in the upper portion of FIG. 2 the bell-shaped housing 12 is shown carrying the nosepiece 10 and in the lower portion the conical-shaped butterfly valve 8 has been rotated to the open position as shown. Stop 14 stops at rotation of the cover 8 and retractable stop 17 is retracted as the cover rotates to a closed position and then returns to its position to act as a stable stop so that the cover is held by stops 14, 17 and the pivots 9.

Next, the operation of the sliding sleeve 13 will be described. Reference will be made to FIGS. 2 through 5B. In FIG. 5A in schematic representation hydraulic cylinders 22 with drive pistons and anchor nuts 23 which may represent threaded bores in slidable sleeve 12 at their drive piston ends (lower FIG. 3) and the hydraulic cylinders are secured in the adapter plate 24 at their other end. The adapter plate 24 is circular and is a ring into which the threaded ends of the bolts 26 and the hydraulic cylinders 22 are screwed into threaded bores (not shown) that are evenly distributed around the adapter plate ring. FIG. 5 illustrates in a schematic way the anchoring and position of these threaded nuts or threaded bores for the bolts 26 when looking at the cowling 2. The left-hand end of the hydraulic cylinders as they are fastened to the adapter plate 24 which in turn is fastened to support or connector plate 24A. The bolts 26 arranged in a circle on the adapter plate at a greater diameter than the distribution of the hydraulic cylinders 22. The bolts 26 can also be seen in FIG. 1. The bolts are positioned so that they will be on the outside of the mesh screen 15a (FIG. 4) and are anchored in the anchor holes 27 in housing 12 shown by the shadow line in the lower part of FIG. 2. This forms a rigid connection between bell-shaped housing 12 and the cowling housing 2.

Hydraulic cylinders 22 are arranged in a smaller diameter circular array than the bolts and pass inside the mesh 15a and anchor into the transition area 19 of sliding sleeve 13. Thus, when the hydraulic cylinders are extended they will drive the sliding sleeve which has a smaller diameter cylindrical section 20 and the larger diameter section 21 connected by transition section 19 into the bell-shaped housing 12 to have the appearance as shown in FIG. 1. When the cylinders are withdrawn the sliding sleeve will move back and around the mesh 15a and seat against the adapter plate 24 and have the appearance as in FIG. 1A. Thus, the sliding sleeve moves from an open position at an opening width A as in FIG. 1 to a closed position as is shown in FIG. 1A. The hydraulic cylinders 22 could be replaced by suitable mechanical or electro-mechanical means to move control members on aircraft as is well-known by those skilled in the art.

The foregoing illustrates one configuration for carrying out the invention which is based on the principle that a lateral shielded air intake can be substituted for direct coaxial air intake in a jet engine during takeoff and landing. Means for closing or blocking the direct, unscreened coaxial air flow to the engine while providing means for screened lateral airflow that will protect the engine from runway debris and other airborne hazards such as birds. Optimum lateral port dimensions and shapes as well as diameters of the parts of the general assembly can be readily determined by those skilled in the art.

While a specific embodiment of the invention has been shown and described in detail to illustrate the application of the principles of the invention, it will be understood that the invention may be embodied otherwise without departing from the scope of said principles described so that the invention is limited only by the scope of the claims which follow.

I claim:

1. A jet engine intake guard system comprising:
    a) a cylindrical cowling in which a jet engine is mounted, said housing having intake and exhaust end;
    b) a bell-shaped housing coaxially mounted on the forward intake end of the cowling, said bell-shaped housing being spaced apart from the cowling by mounting bolts with a lateral space between the bell-shaped housing and the cowling intake providing air intake into the cowling intake;
    c) a cylindrical sliding sleeve having forward and rear openings, said sleeve being coaxially mounted in said bell-shaped housing in a telescoping manner to open and close the lateral air intake;
    d) means for moving said sleeve from an open position to a closed position to open and close the lateral air intake;
    e) a cylindrical nosepiece coaxially mounted on the forward end of the bell-shaped housing, said cylindrical nosepiece positioned on the forward or air intake end of the bell-shaped housing having an air intake opening for receiving axial flow air to the engine and having air intake ports distributed around the nosepiece's lateral surface; and, f) a conical-shaped butterfly valve mounted on the forward end of said nosepiece covering the forward or intake opening thereof, said conical valve being rotatable 180° from an open position to a close position whereby when in a closed position debris striking conical nose will be deflected away from the cowling and engine, said bell-shaped housing providing a secondary deflection for any debris striking it.

* * * * *